US009651172B2

(12) United States Patent
McNamee, Jr.

(10) Patent No.: US 9,651,172 B2
(45) Date of Patent: May 16, 2017

(54) ROTATABLE ADJUSTABLE SEGMENTED CLAMP

(71) Applicant: Michael Neal McNamee, Jr., Towson, MD (US)

(72) Inventor: Michael Neal McNamee, Jr., Towson, MD (US)

(*) Notice: Subject to any disclaimer, the term of this patent is extended or adjusted under 35 U.S.C. 154(b) by 0 days.

(21) Appl. No.: 14/545,009

(22) Filed: Mar. 16, 2015

(65) Prior Publication Data
US 2016/0273680 A1 Sep. 22, 2016

(51) Int. Cl.
*F16L 19/00* (2006.01)
*F16L 3/10* (2006.01)
*F16B 2/06* (2006.01)

(52) U.S. Cl.
CPC ............ *F16L 3/1066* (2013.01); *F16B 2/065* (2013.01)

(58) Field of Classification Search
CPC .............................. F16L 3/1066; F16K 27/00
USPC .............. 248/70; 285/112, 420; 24/284, 276
See application file for complete search history.

(56) References Cited

U.S. PATENT DOCUMENTS

| 2,166,412 A * | 7/1939 | Kiesel | E03B 9/02 285/2 |
| 2,396,837 A * | 3/1946 | Ellinwood | F16L 3/1008 174/40 CC |
| 2,473,102 A * | 6/1949 | Krooss | F16L 17/04 285/112 |
| D184,119 S | 12/1958 | Brown | D8/396 |
| D188,563 S | 8/1960 | Vixler | D8/71 |
| 3,013,821 A | 12/1961 | Bogan | F16L 23/08 285/407 |
| 3,413,693 A * | 12/1968 | Tonnelline | F16B 2/065 24/276 |
| D225,506 S | 12/1972 | Priore | D8/394 |
| 3,856,245 A * | 12/1974 | Byerly | F16L 55/035 248/74.3 |
| D279,646 S | 7/1985 | Ferdinand et al. | |
| 4,647,083 A | 3/1987 | Hashimoto | F16L 25/065 285/321 |

(Continued)

FOREIGN PATENT DOCUMENTS

KR 300642884 5/2012 ............... 8/8
KR 300752415 7/2014 ............... 8/8

OTHER PUBLICATIONS

Kẹp góc vuông dây nylon dài 4m, kẹp góc da giác, vietnamese website no. date, https://muabannhanh.com/kep-goc-vuong-day-nylon-dai-4m-kep-goc-da-giac-id-aa6e0400. [site visited Sep. 1, 2016 6:29:45 PM].

(Continued)

*Primary Examiner* — Anita M King
(74) *Attorney, Agent, or Firm* — Breneman & Georges

(57) ABSTRACT

A low profile rotatable adjustable segmented clamp device having a substantially flat rotatable surface composed of individual segments having adjustable fasteners sequentially connecting the individual elements to form the rotatable adjustable segmented clamp. The low profile and rotatability of the clamp is achieved for by having each adjustable fastener disposed within the outer perimeter of the rotatable adjustable clamp. As a consequence of its low horizontal and vertical profile the rotatable adjustable clamp prevents failure of municipal water main valves.

20 Claims, 20 Drawing Sheets

(56) References Cited

U.S. PATENT DOCUMENTS

| | | | |
|---|---|---|---|
| D294,384 S | 2/1988 | Endo | D23/265 |
| 4,722,561 A | 2/1988 | Heckethorn et al. | |
| D307,535 S | 5/1990 | Hsu | D8/71 |
| 5,305,978 A * | 4/1994 | Current | F16L 3/1075 |
| | | | 248/230.4 |
| 5,443,581 A | 8/1995 | Malone | |
| D371,059 S | 6/1996 | Howe | D8/72 |
| 5,540,465 A | 7/1996 | Sisk | F16L 17/04 |
| | | | 285/112 |
| 5,706,862 A | 1/1998 | Meinerding | |
| 6,164,604 A | 12/2000 | Cirino et al. | |
| 6,499,774 B1 * | 12/2002 | Smith | F16L 23/08 |
| | | | 285/363 |
| 6,601,866 B1 * | 8/2003 | Dobies | A61G 5/10 |
| | | | 248/68.1 |
| 6,615,915 B2 | 9/2003 | Koleilat | |
| 6,789,578 B2 | 9/2004 | Latham et al. | |
| D514,915 S | 2/2006 | Wang | D8/72 |
| 7,179,010 B2 | 2/2007 | Weger et al. | |
| D539,639 S | 4/2007 | Nagle | D8/396 |
| 8,353,486 B2 | 1/2013 | Osborn | F16L 3/04 |
| | | | 248/228.1 |
| D708,053 S | 7/2014 | Marini | D24/127 |
| D714,629 S | 10/2014 | Irgens | D8/394 |
| 8,979,138 B2 | 3/2015 | Dole | F16L 17/04 |
| | | | 285/253 |
| 9,291,290 B2 | 3/2016 | Prischak | F16L 11/12 |
| 9,512,714 B2 * | 12/2016 | Sobolewski | E21B 47/01 |
| 2004/0036291 A1 | 2/2004 | Dole | F16L 21/06 |
| | | | 285/367 |
| 2007/0034752 A1 | 2/2007 | Weger et al. | |
| 2014/0001691 A1 | 1/2014 | Royal | B25B 5/003 |
| | | | 269/45 |
| 2016/0091131 A1 | 3/2016 | Roach | F16L 13/116 |
| | | | 285/285.1 |
| 2016/0161034 A1 | 6/2016 | Stephenson | F16B 1/00 |
| | | | 285/413 |
| 2016/0186902 A1 | 6/2016 | Lee | F16L 21/06 |
| | | | 285/420 |

OTHER PUBLICATIONS

Brennan CTS-16, Steel Standard Duty Tube Clamp, website copyright 2016. https://www.amazon.com/Brennan-CTS-16-Steel-Standard-Clamp/dp/B005C7L0ZU/ref=sr_1_1173?s=hi&ie=UTF8&qid=1472664024&sr=1-1173&keywords=clamp, [site visited Aug. 31, 2016 1:21:42 PM].

Shop Sioux Chief 1/2-in Dia Plastic Pipe Stay at Lowes.com, website copyright 2016, http://www.lowes.com/pd/Sioux-Chief-1-2-in-Dia-Plastic-Pipe-Stay/999927826, [site visited Sep. 1, 2016 6:51:32 PM].

* cited by examiner

ROTATABLE ADJUSTABLE SEGMENTED CLAMP

CROSS REFERENCE TO RELATED APPLICATIONS

The subject matter of this patent application is related to a design patent application titled SEGMENTED CLAMP which is being filed concurrently herewith.

BACKGROUND OF THE INVENTION

1. Field of the Invention

This invention relates to a segmented clamp. More particularly the invention pertains to an adjustable rotatable segmented clamp that accommodates a plurality of shaft sizes with a shaft collar bearing surface to lock the shaft from axial displacement while the bearing surface on the clamp accommodates axial rotation.

2. Description of the Related Art and Information Disclosed Under 37 C.F.R. §1.56

A wide variety of clamps exist in the prior art. Most of the prior art clamps are designated for a particular purpose and do not combine aspects of adjustability to accommodate a plurality of pipe or shaft sizes with a segmented clamp that locks a pipe or shaft from axial displacement with a bearing surface to accommodate the axial rotation of the pipe or shaft.

Due to the operational environment and requirements for the novel clamp much of the prior art is inapplicable or non analogous. The environmental arena primarily pertains to large water main valves that are subjected to the extreme summer and winter conditions that result in water main breakage and water main valves that are seldom opened and closed except when a water main breaks.

A typical prior art water main valve 42 is illustrated in FIG. 1. Water main valve 42 includes a valve actuation shaft 44 which needs to be rotated to close the water main valve. Due to the fact such valves are not routinely opened and closed many times a valve will fail because a bonnet bushing in the valve fails. Failure of the valve actuation shaft and bonnet bushing may result from axial displacement forces in the direction of arrow 46 over time that repeatedly acts upon shaft 44 due to seasonal temperature changes, water pressure variations, corrosion, water fluorination and mineral constituents which prevent the valve shaft 44 and bonnet bushing from allowing the operation of the gearing necessary to close valve 48. In addition the circumference of the valve shaft 44 and the circumference of the adapter vary from valve to valve which necessitates an adjustable and rotatable clamp capable of accommodating various shaft and/or adapter circumferences.

The neck space 49 between the adapter 50 and spur gear assembly 52 of the valve shaft is extremely limited and is further restricted by bolts 54 that fasten the adapter 50 to a stuffing box 58. The limited and restricted space available to clamp neck 49 of valve actuation shaft in place as well as the clamping force required to hold a shaft in place preclude use of an adjustable band prior art clamp such as Meinerding, Sr. U.S. Pat. No. 5,706,862.

Segmented clamps prior art clamps such as Weger, et al. U.S. Pat. No. 7,179,010 and Weger, et al. U.S. Pub. 2007/0034752 provide clamps for accommodating pipes of various sizes. Segmented clamps such as Weger would not provide a sufficiently low profile and a substantially flat bearing surface to prevent axial displacement of a valve actuation shaft while at the same time provide sufficient clamping force while allowing rotational motion necessary to actuate the water main valve.

Prior art segmented clamping devices also include hinged clamping devices such as described in Latham, et al. U.S. Pat. No. 6,789,578 and Cirino, et al. U.S. Pat. No. 6,164,604. Hinged segmented devices such as Latham, et al. U.S. Pat. No. 6,789,578 provide greater clamping forces but are limited to a particular shaft or shaft collar circumference. This limitation inherent in hinged clamping devices forces the installer of the clamp to keep a number of clamp sizes to accommodate each separate pipe or shaft having a diameter anywhere between from about 4 inches (10.16 cm) to 8 inches (20.32 cm). The novel clamp in contrast will with a single adjustable segmented clamp accommodate pipes or shafts from about 4 inches (10.16 cm) to 8 inches (20.32 cm) while at the same time providing a secure and uniform clamping force around the pipe or shaft.

Segmented high clamping force clamps with a uniform clamp loading are also found in Christmas trees and blow out preventers in the oil and gas industry as described in Malone U.S. Pat. No. 5,443,581 and Koleilat U.S. Pat. No. 6,615,915. Such segmented high clamping force clamps like the invention include individual bolts which bolt each segment in place. This prior art like the other segmented prior art is limited to specific segments that accommodate a pipe or shaft of a specific diameter. In addition unlike the invention such segmented prior art employ bolts or screws that are not tangential to the pipe or shaft and pipe or shaft bearing surface but project perpendicularly to the pipe or shaft bearing surface.

The disadvantages of prior art clamps thus include lack of clamping force and the absence of a rotatable and friction reduced bearing surface for clamping around a rotatable shaft while preventing axial displacement of the pipe or shaft.

Other disadvantages of the prior art include limitations on clamping force at the expense of adjustability and adaptability required to accommodate various pipe or shaft diameters. Other disadvantages include the axial thickness and profile of the clamp and the inability of the clamp to provide a uniform clamping force around the pipe or shaft in a limited space environment.

Another disadvantage of prior art clamps is the difficulty of installing a hinged or segmented clamp around a shaft or pipe having limited access both horizontally and vertically as found in many water main valves. The low profile of the novel clamp solves the problem of limited vertical access while providing the ability to add and sequentially connect individual segments horizontally with an adjustable bolt to adjust and tighten each segment together individually. This advantage allows the novel clamp to be added to a valve actuation shaft having limited horizontal access as found in water main valves.

Other disadvantages and limitations in prior art clamps as well as the advantages of the novel clamp of the invention will become apparent from the summary of the invention, drawings and detailed description of the invention.

SUMMARY OF THE INVENTION

One aspect of the invention is to provide a segmented clamp capable of accommodating a plurality of pipe or shaft sizes utilizing a plurality of individually adjustable segments that are adjustably bolted together to form a single clamp.

Another aspect of the invention is to provide at least one flat bearing surface for limiting axial displacement of the pipe or shaft while freely accommodating the rotational motion of the pipe or shaft.

Another aspect of the invention is to provide a low profile segmented clamp assembly that allows the clamping force to be distributed among the various segments and uniformly adjusted with each segment in contact with the pipe or shaft.

Yet another aspect of the invention is the provision of a friction reduction coating or treatment of the flat bearing surface.

Yet another aspect of the invention is to provide a treatment or coating on the pipe or shaft contact surface of each segment to increase the grip on the contact surface of each segment on the pipe or shaft.

Yet another aspect of the invention is to accommodate pipes and shafts having a rectangular or triangular cross section.

Still yet another aspect of the invention is to provide a low axial and radial profile of the clamp including the fasteners which are disposed within the perimeter of the novel clamp.

Still another aspect of the invention is to provide a low profile or recessed opening for each bolt connecting each segment at least in part in circumferential alignment with the pipe or shaft contact surface.

And still yet another aspect of the invention is the provision for an elastomeric or rubber coating on the inside of the pipe contact surface of each segment to reduce galvanic and electrochemical corrosion.

And yet still another aspect of the invention is to provide an adjustable segmented clamp capable of accommodating a plurality of pipe or shaft configurations and sizes other than circular such as shafts of rectangular, triangular or other geometric configurations.

Accordingly an adjustable segmented clamp is provided having a low profile with a strong clamping force having a substantially flat rotatable bearing surface with a clamping surface disposed substantially perpendicular to the substantially flat rotatable bearing surface and a low profile adjustable fastening device interconnecting each of the adjustable segments. The low profile of adjustable segmented clamp allows the clamp to be added to existing shafts on devices having restricted axial area to add a clamp with a strong clamping force to prevent axial displacement of the shaft while permitting unrestricted rotational movement of the shaft. The substantially flat rotatable bearing surface optionally can include a friction reduction coating such as plastic or TEFLON which is a proprietary mark of DuPont De Nemours, E.I. & Co.

The interior clamping surface of each adjustable segment is of a configuration generally matching the configuration of the pipe or shaft being clamped. Each interior clamping surface optionally includes a coating or surface treatment consistent with its application. For example, where clamping force is paramount, the interior surface of each segment has a cross hatched file like surface, grooves, teeth or an abrasive surface or a combination thereof for cooperating with each adjustable fastening device interconnecting each of the segments to provide a vise like grip. In other applications where corrosion is of concern the interior surface of each segment may be coated or treated with rubber or plastic to reduce galvanic and static electricity and intermetallic corrosion forces.

Each adjustable segment includes a low profile adjustable fastening device. In the preferred embodiment each segment includes a threaded opening at one end of each segment and an unthreaded opening with or without a boss at the other end for receiving a bolt in a substantial tangential alignment or in alignment with the interior clamping surface depending upon the configuration of the interior clamping surface of each adjustable segment. The low profile adjustable fastening device together with individual segments allows each segment to be installed on shafts having limited vertical and horizontal access. In applications where only 25% of the shaft may be accessible horizontally each segment is separately threaded and rotated around the shaft until room is available for adding or threading the next segment. Each adjustable fastening device or bolt can be individually tightened while the shaft or pipe is turned to tighten the adjustable and rotatable clamp or the final bolt is tightened after fixing each preceding bolt in an approximate circumferential position.

The novel clamp includes a plurality of individually adjustable segments and an adjustable segment fastener for each segment. Each segment includes an inside face for gripping a portion of a pipe or shaft. The segmented adjustable segment clamp can include three or more segments with an adjustable segment fastener for each segment in coaxial alignment or tangential coaxial alignment with the inside face for gripping a portion of a pipe or shaft depending upon the shape of the shaft. As used herein a plurality of segments means three or more individual segments form the novel clamp.

Each segment of the novel segmented clamp is preferably interchangeable and interlockable. Each segment together with the fastening device despite its low profile can be capable of providing a gripping force of about 1,200 pounds per square inch or about 48,000 pounds per square inch for a four segmented clamp constructed in accordance with the preferred embodiment.

The foregoing advantages and aspects of the invention will be described in further detail in the detailed description of the invention and best mode when taken in conjunction with the accompanying drawings.

BRIEF DESCRIPTION OF THE DRAWINGS

The drawings are provided to further illustrate the invention but are not drawn to scale or to show particular angles on various segments which are modifiable within the scope of the invention. The foregoing summary and description of the invention and its patentable differences from the prior art will become apparent with reference to the detailed description and the following drawings in which.

DETAILED DESCRIPTION OF THE PREFERRED EMBODIMENTS AND BEST MODE

Figure 1:
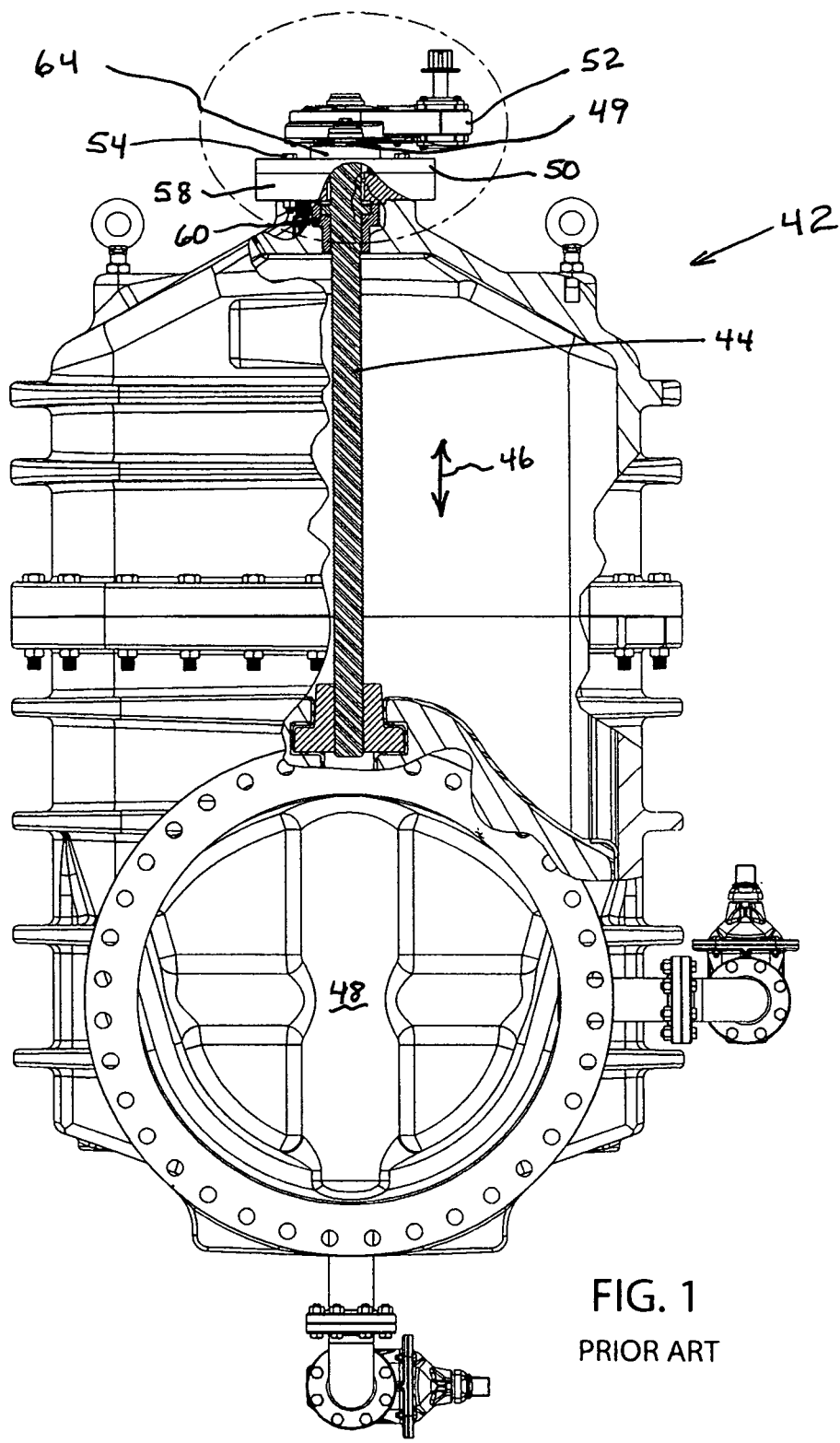
FIG. 1 is a prior art elevational view of a water main valve partly in section.

The detailed embodiments and best mode disclosed and discussed herein are only exemplary of an invention having a broad range of applications and adaptability. Therefore the invention as disclosed in the drawings are susceptible to modifications by those skilled in the art which may be included within the scope of the claims and the invention.

One aspect of the invention is directed to a specific application namely to preventing failure of water main valves. This aspect of the invention is achieved by preventing the bonnet bushing 60 FIGS. 1, 1A and 1B from coming out of the valve bonnet 62 by preventing axial displacement of valve actuating shaft 44 and locking the valve shaft in place. Failure of the bonnet bushing requires shut down of the entire valve, drainage of the water, digging and removal of all or part of the valve backfilling and recharging the entire water main valve system. Failure of the bonnet bushing is a consequence of age, infrequent use, seasonal changes, and changes in water pressure which ranges from 22 to 250 psi and can go as high as 500 psi.

Figure 1A:
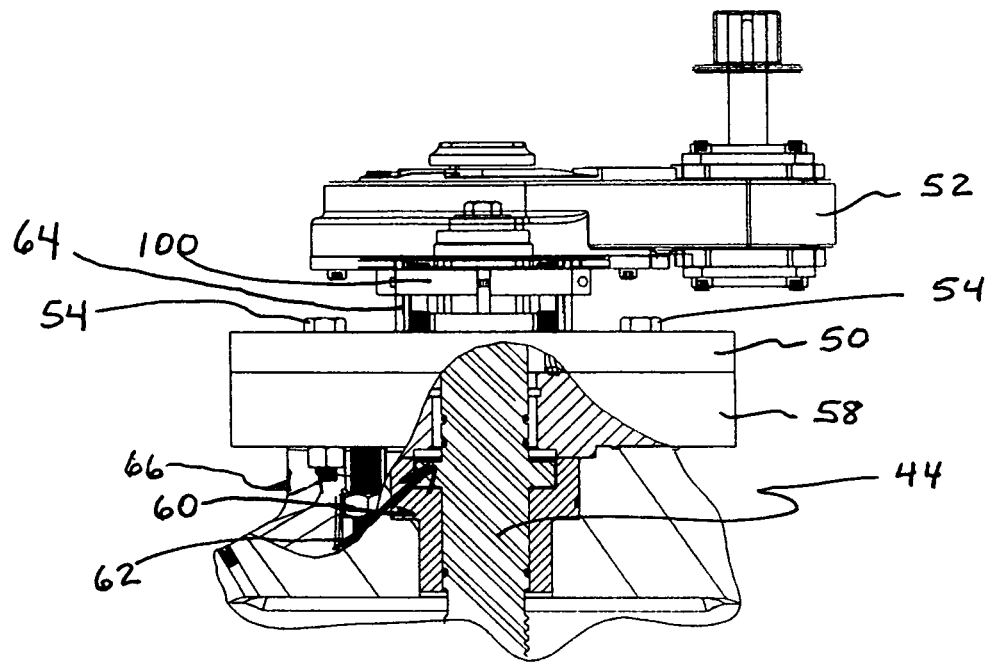
FIG. 1A is an elevational view partly in section of the circled portion 1A of FIG. 1 illustrating the addition of the novel clamp to a valve actuation shaft.
Figure 1B:
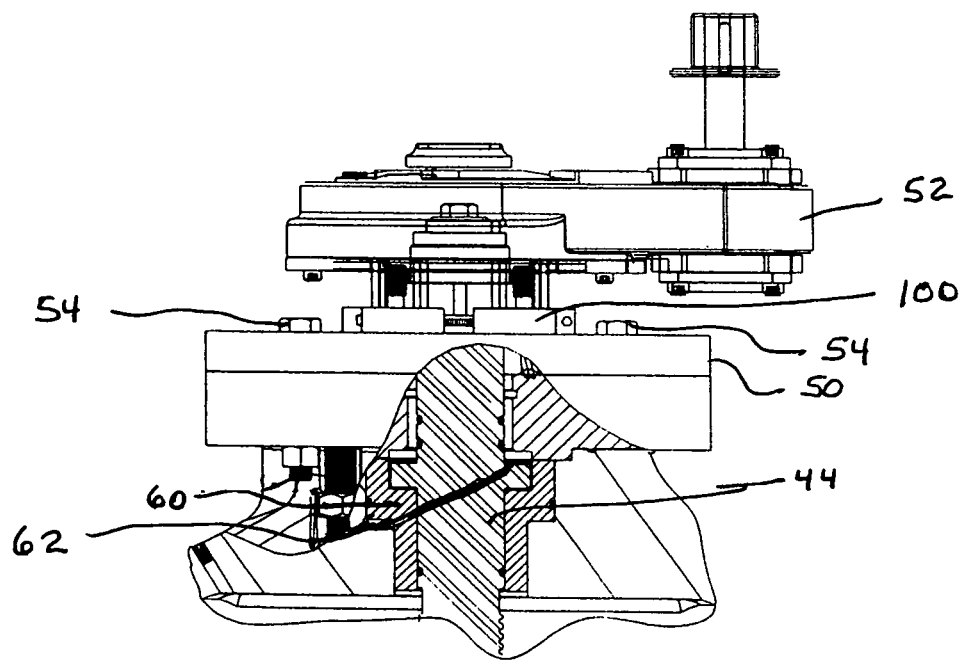
FIG. 1B is an elevational view partly in section of the circled portion 1A of FIG. 1 illustrating the addition of the novel clamp to a collar of a valve actuation shaft.
Figure 2:
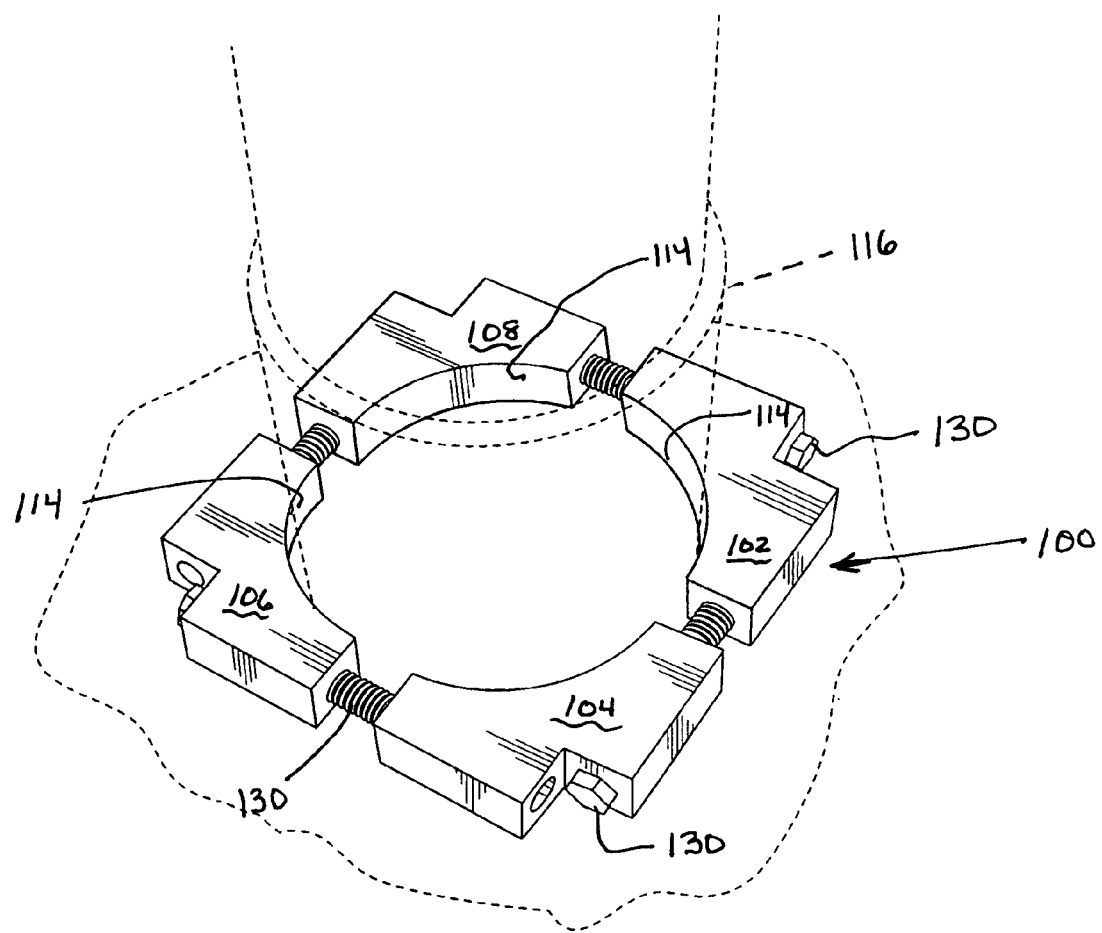
FIG. 2 is a perspective view of a novel adjustable four segmented clamp in accordance with the best mode.
Figure 3:
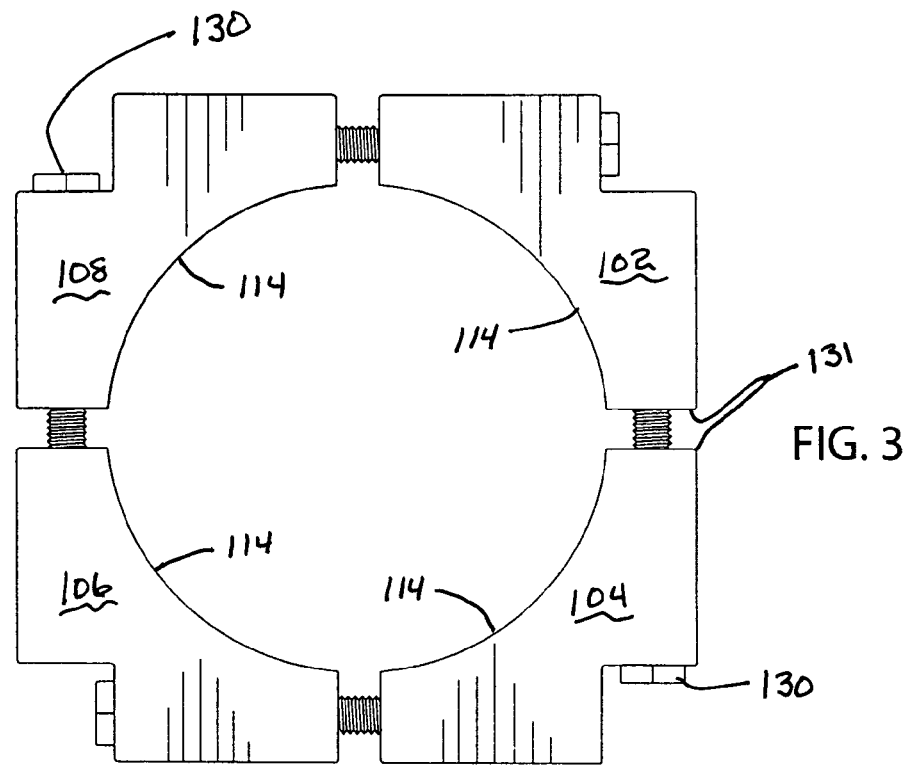
FIG. 3 is a top plan view of FIG. 2.
Figure 4:
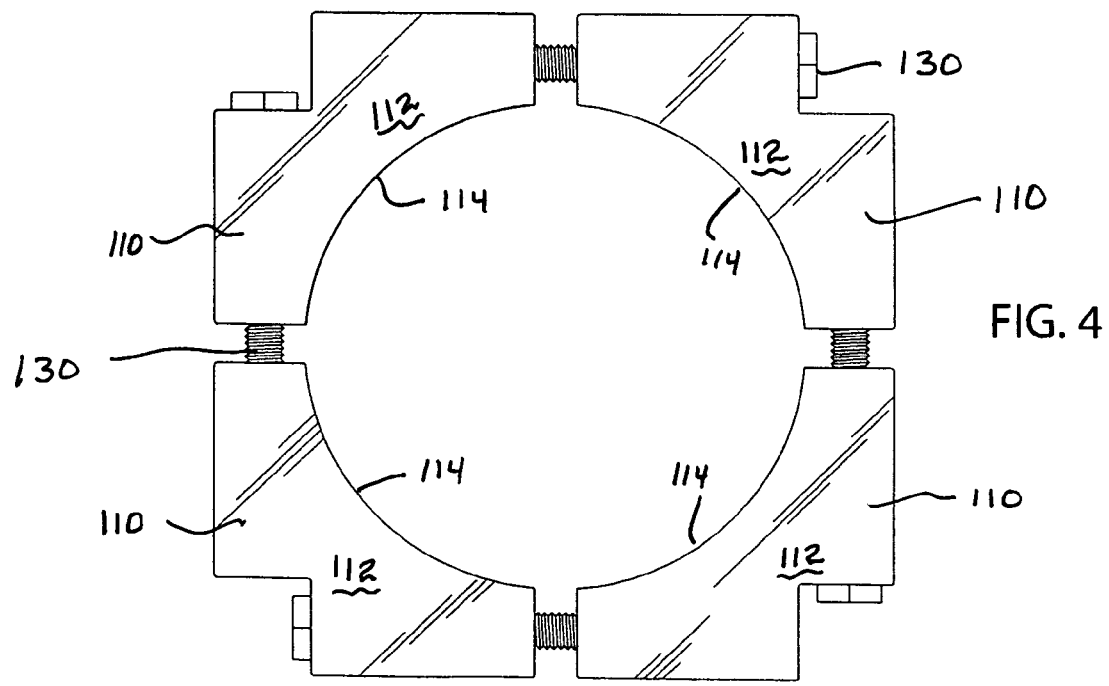
FIG. 4 is a bottom plan view of a novel adjustable four segmented clamp with a friction reducing coating.
Figure 7:
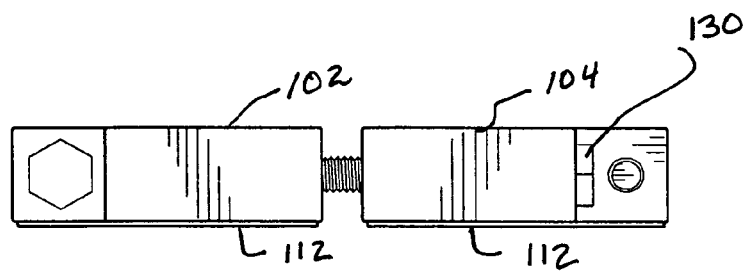
FIGS. 5-8 are side views of FIG. 4.
Figure 6:
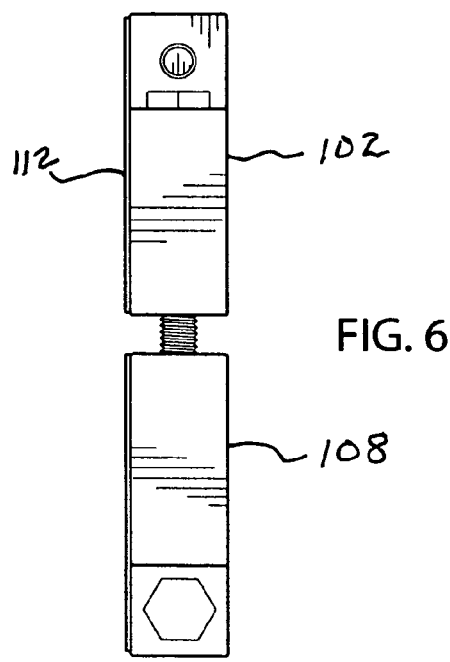
Figure 5:
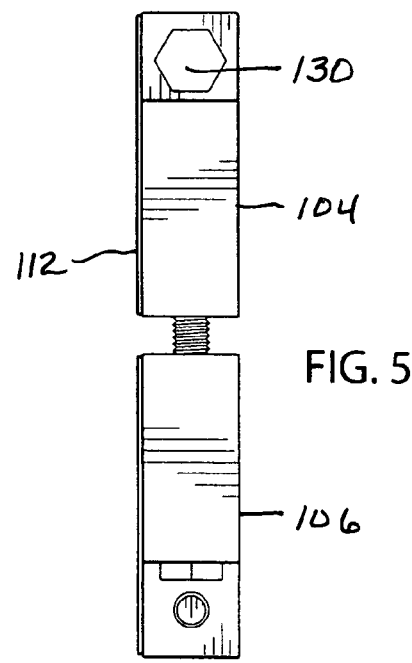
Figure 8:
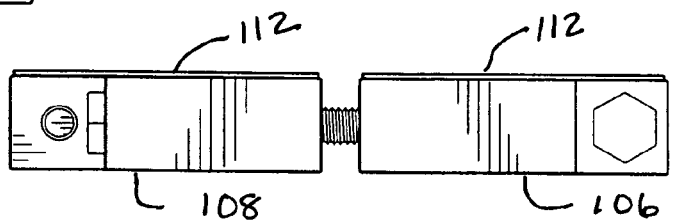

The novel segmented rotatable adjustable clamp 100 prevents failure of the bonnet bushing 60 by preventing the valve actuation shaft 44 from axial displacement in the direction of arrow 46 thereby functioning as a bonnet bushing but much stronger as the valve actuating shaft 44 is locked out of axial displacement by clamping on the valve actuation shaft 44 which clamp is then supported by the valve collar 64 which in turn is supported by the valve housing 66 as shown in FIG. 1A. Alternatively rotatable adjustable clamp 100 in certain valves can be placed on the valve collar 64 as shown in FIG. 1B where the valve collar is part of the rotatable valve actuation shaft 44. In FIG. 1B clamp 100 also functions as a bonnet bushing but also much stronger as the valve actuation shaft is locked out of axial displacement by clamping on the collar of the valve actuation shaft and in this case is supported by adapter 50 which is supported by valve housing 66. In the case of FIG. 1A and FIG. 1B the axial displacement of the valve actuation shaft 44 is limited in the direction of arrow 46 while allowing valve actuation shaft to be rotated clockwise or counter-clockwise to close or open the water main valve. It will also be recognized that the same rotatable adjustable clamp can be used to accommodate a valve actuation shaft of different diameters or valve actuation shafts having collars of different diameters as a result of having a plurality of separate segments and a plurality of adjustable fasteners disposed between the plurality of separate segments.

Other aspects of the invention are directed to the novel segmented rotatable adjustable clamp as a consequence of its low profile rotatability and adjustability resulting from its segmentation without regard to its specific application to water main valves. This aspect of the invention pertains to a segmented clamp having a flat rotatable bearing surface with a clamping surface disposed substantially perpendicular to the flat rotatable bearing surface and a plurality of adjustable fasteners disposed in axial alignment around the perimeter and within the perimeter of the flat bearing surface as illustrated in FIGS. 2-8.

Referring now to FIGS. 2-8 the novel segmented rotatable adjustable clamp in the best mode and preferred embodiment includes four identical segments 102, 104, 106 and 108. Each segment has a rotatable bearing surface 110 (FIG. 4) which optionally may have a coating 112 of plastic such as TEFLON a proprietary mark of DuPont De Nemours, E.I. & Co. or otherwise treated to increase its rotational bearing surface properties. The type of treatment or coating will depend upon the nature and speed of rotation of the novel clamp in its operative application.

Each segment 102, 104, 106 and 108 includes an inside clamp surface 114 which is designed to correspond to the general configuration of a pipe or shaft 116. Inside clamp surface 114 depending on application may be optionally coated with plastic or rubber 118 (FIG. 18) to provide electrical insulation against corrosion or galvanic action or modified to include file like teeth or grooves 120 or teeth 122 (FIG. 12 and FIG. 21) to mechanically increase the clamping force against a pipe or shaft 116. In the preferred mode segment 102, 104, 106 and 108 has one unthreaded aperture 124 (FIG. 24) and one threaded aperture 128. A boss 126

Figure 28:
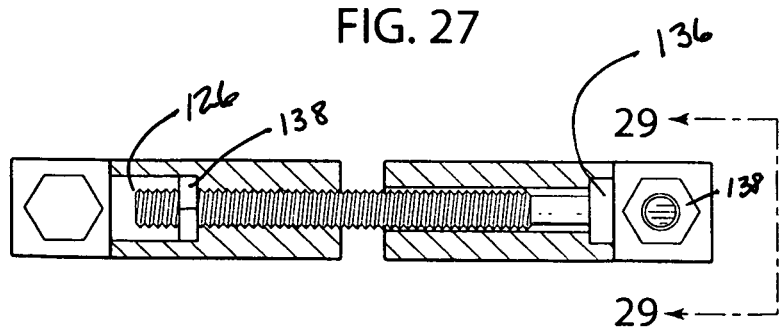

(FIG. 28) may be provided instead of a threaded aperture on one end to capture a nut 138 to receive the adjustable fastener 130.

The inside surface 114 of each segment in general corresponds to the general configuration of a pipe or shaft together with adjustable fastener 130 and the space 131 (FIG. 3) between segments providing adjustability and versatility to clamp 100 by having one clamp accommodate pipes or shafts 25% larger or 25% smaller in circumference or perimeter. The clamp can also be modified to accommodate pipes or shafts that are not round as will be described hereinafter in greater detail.

Figure 24:
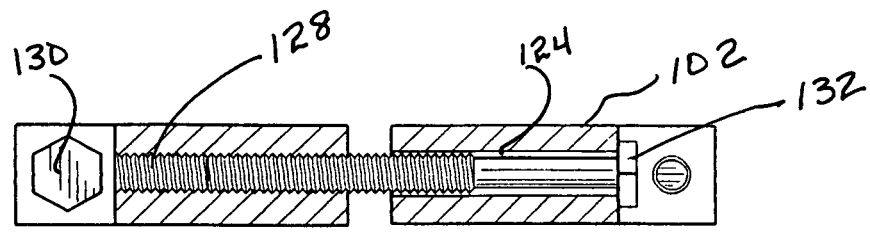
FIGS. 24-29 are alternative embodiments of various adjustable fastening device alternatives for the novel adjustable and rotatable segmented clamp.
Figure 25:
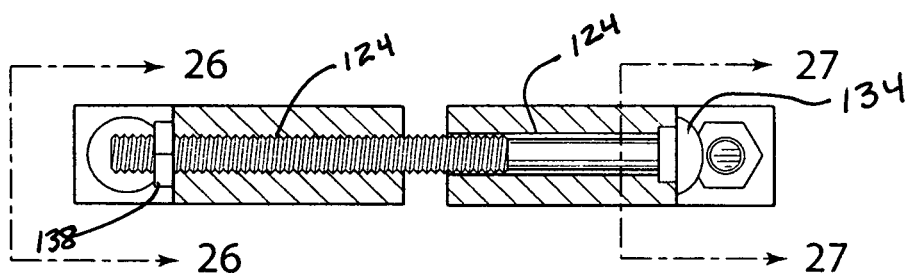
Figures 26, 29:
Figure 27:
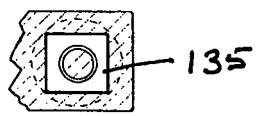
Figure 32:
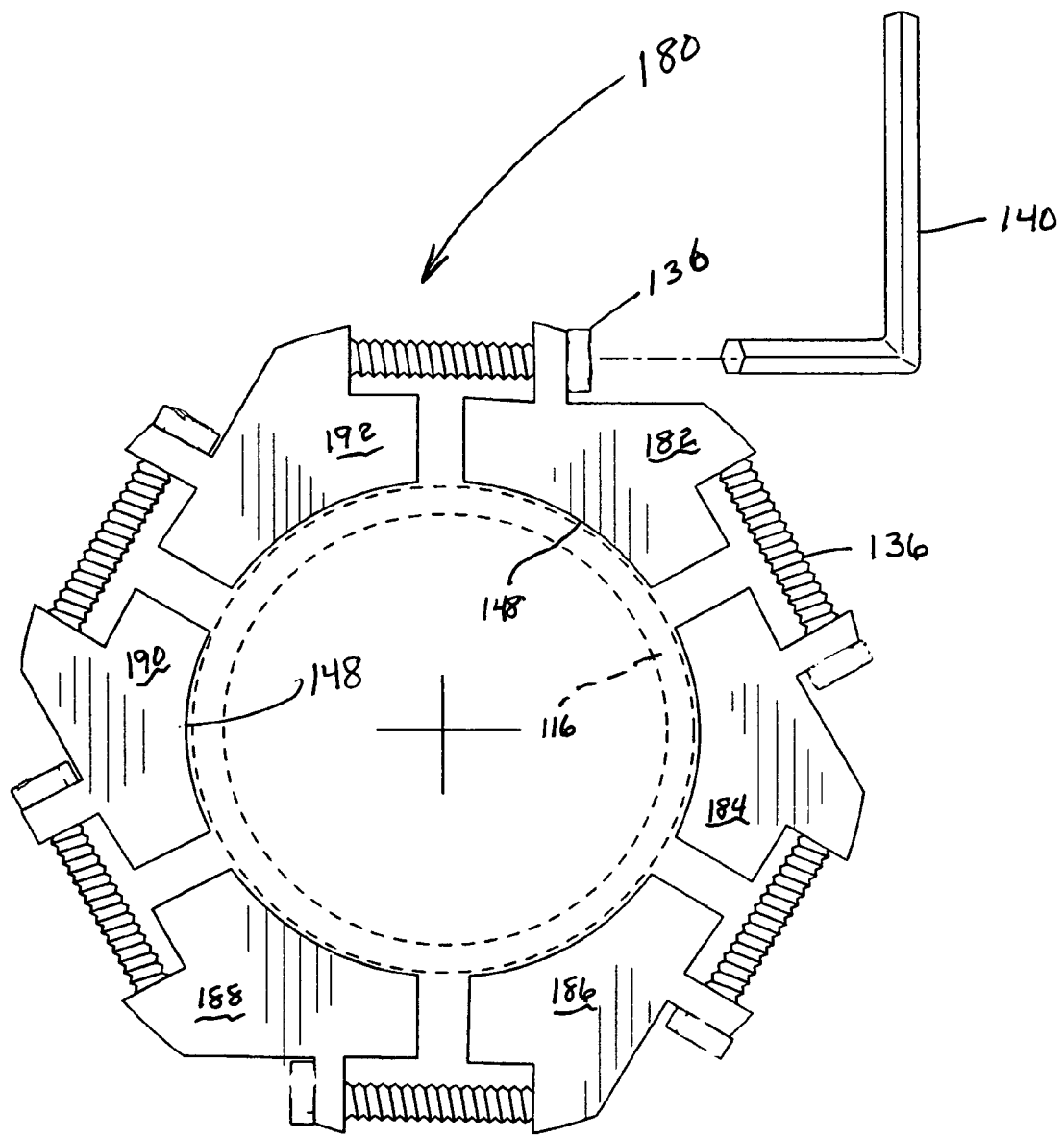
FIG. 32. is a top plan view of a further embodiment of the novel rotatable and adjustable segmented clamp with six independently adjustable segments.

The adjustable fastener 130 of each segment in the preferred embodiment is a bolt. The bolt may be a machine bolt 132 as illustrated in FIG. 24 or other type of adjustable fastener known to those skilled in the art. For example bolt 132 can be a carriage bolt 134 (FIG. 25) or a hex bolt 136 (FIG. 28) or a large machine screw with a flat head or Phillips head. Where a carriage bolt 134 is utilized both ends of each segment have unthreaded apertures 124 but one end has a square opening 135 (FIG. 27) to capture the neck of carriage bolt 134. A nut 138 is utilized at the end of each segment to adjustably attach each segment. In other embodiments a hex bolt 136 can be used which may be countersunk since the tightening of segments is accomplished with an Allen wrench 140 (FIG. 32).

In the preferred embodiment and in application to water main valves each segment 102, 104, 106 and 108 is made of high quality steel preferably stainless steel. Similarly adjustable fasteners 130 are made of high tensile strength steel. Each segment 102, 104, 106 and 108 is about 0.5 inch (1.25 cm) to 1 inch (2.54 cm) thick. The installation of the novel clamp 100 to a water main valve to protect the internal bonnet bushing 60 can be accomplished without digging out the water main valve or disassembling the water main valve or shutting down the water supply to the valve which is generally in the range of 30 to 250 psi. In addition where the pipe or shaft is shielded so that only for example ¼ of the shaft is open the segments can be sequentially connected and threaded around the shielded structure. It will be recognized by those skilled in the art that in other applications different metals could be used to form the novel segmented clamp of the invention. It will also be recognized that high density plastic can be used in applications that do not require high clamping forces.

Figure 9:
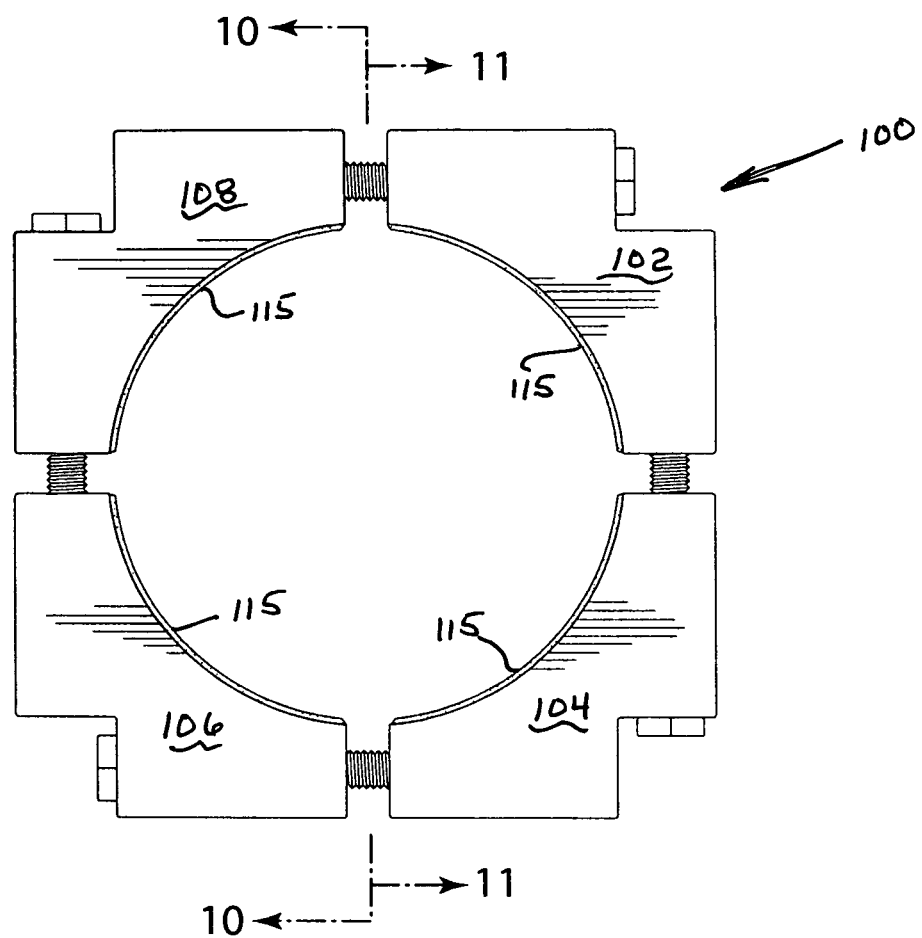
FIG. 9 is a top plan view of a novel adjustable four segmented clamp with a clamp contact surface friction increasing treatment.
Figures 10, 11:
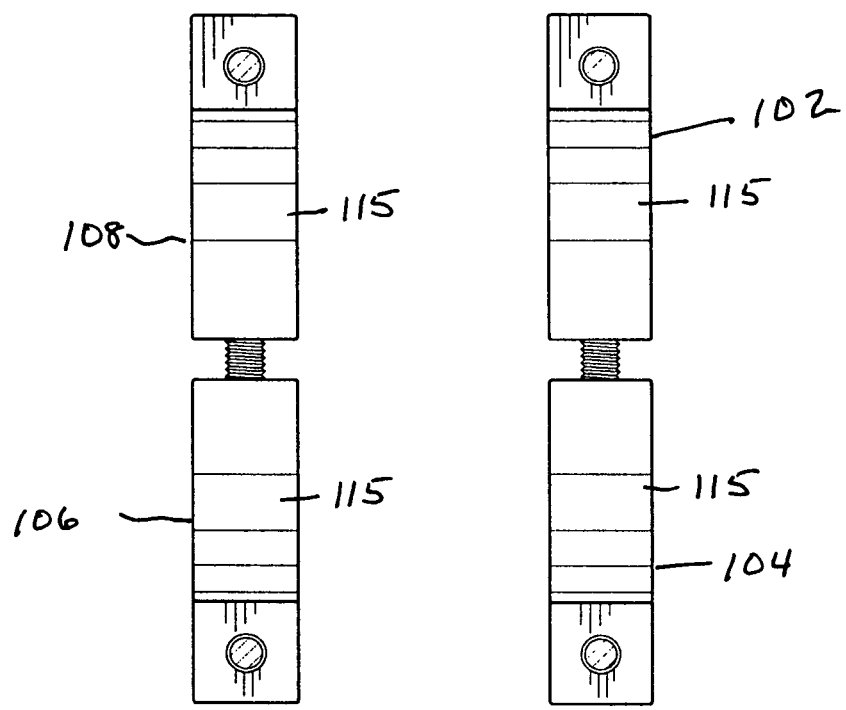
FIG. 10 is a view of the adjustable four segmented clamp taken along the line 10-10 of FIG. 9.
FIG. 11 is a view of the adjustable four segmented clamp taken along the line 11-11 of FIG. 9.
Figure 12:
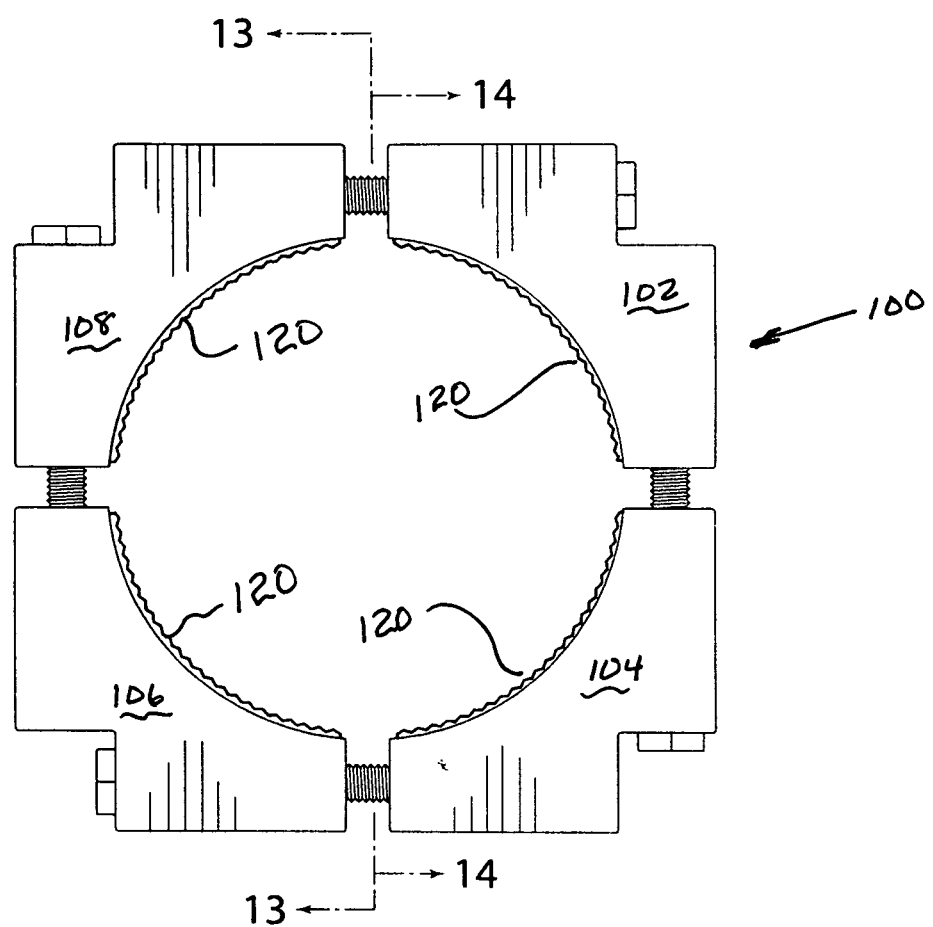
FIG. 12 is a top plan view of an adjustable four segmented clamp with a clamp contact surface friction increasing surface treatment.
Figures 13, 14:
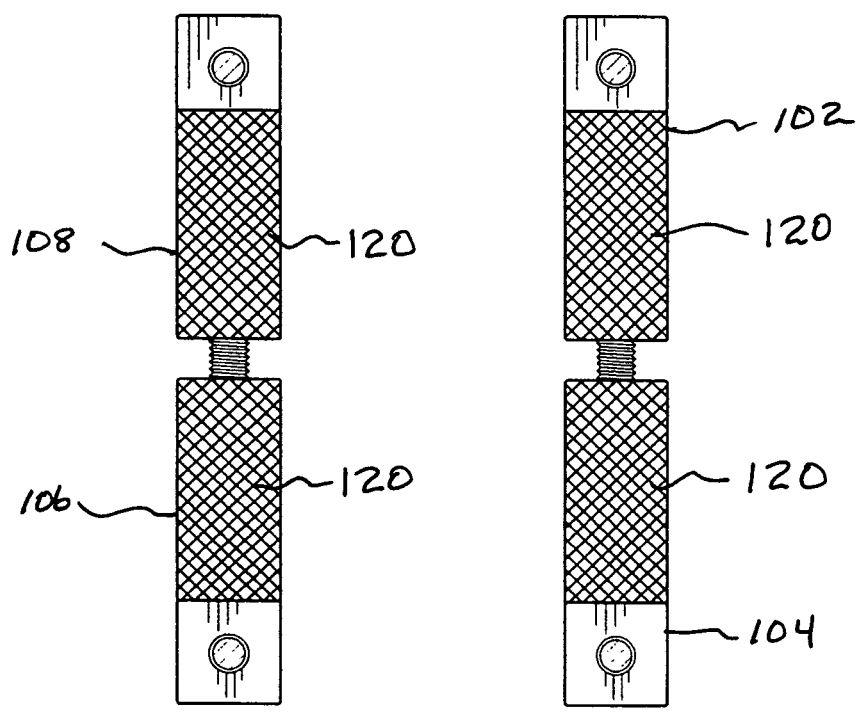
FIG. 13 is a view of the adjustable four segmented clamp taken along the line 13-13 of FIG. 12.
FIG. 14 is a view of the adjustable four segmented clamp taken along the line 14-14 of FIG. 13.
Figure 15:
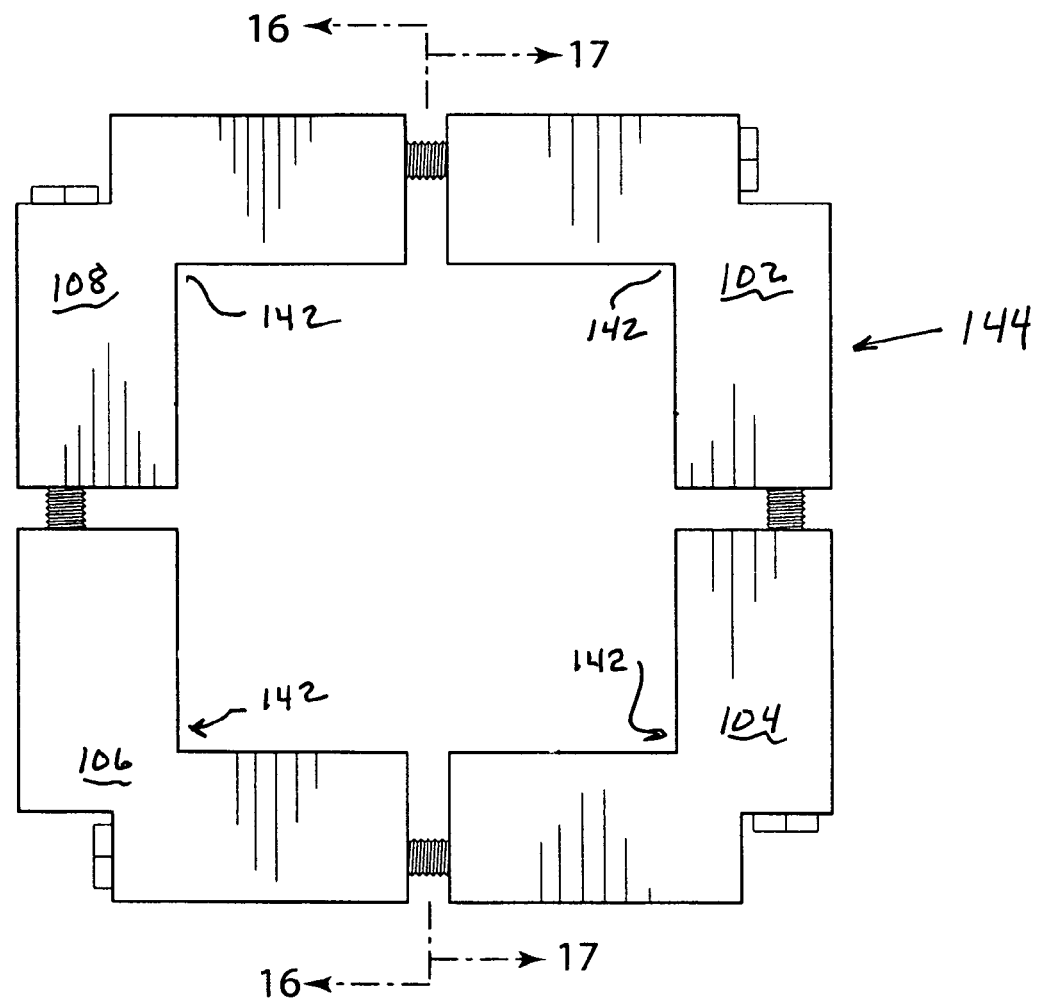
FIG. 15 is an alternative embodiment of a novel adjustable four segmented clamp for a rectangular pipe or shaft.
Figures 16, 17:
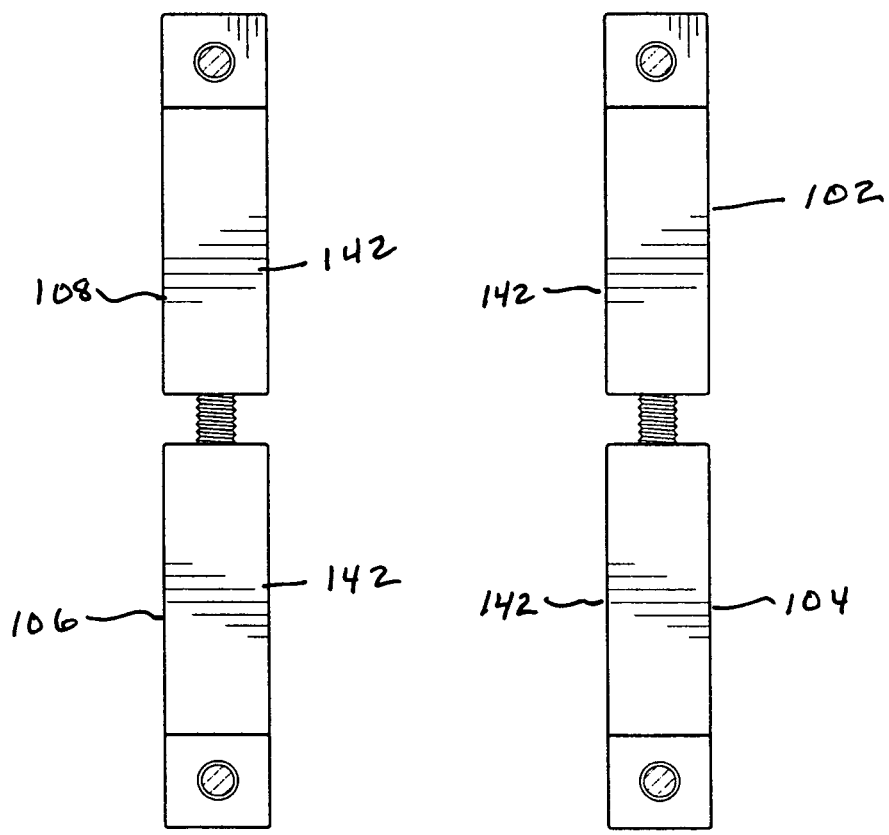
FIG. 16 is a view of the alternative embodiment of the adjustable four segmented clamp taken along the line 16-16 of FIG. 16.
FIG. 17 is a view of the alternative embodiment of the adjustable four segmented clamp taken along the line 17-17 of FIG. 15.

Referring now to FIGS. 9-15 the novel rotatable adjustable segmented clamp 100 includes a clamp surface coating or treatment to increase the frictional engagement between each segment of the clamp and the pipe. In FIG. 9 each segment 102, 104, 106 and 108 includes an abrasive coating or surface treatment. Standard coatings or surface abrasive treatments 115 may be employed as known to those skilled in the art. In FIGS. 12-14 grooves or fine file like cross grooves 120 may be applied to the novel clamp to augment the clamp gripping surface.

Figure 18:
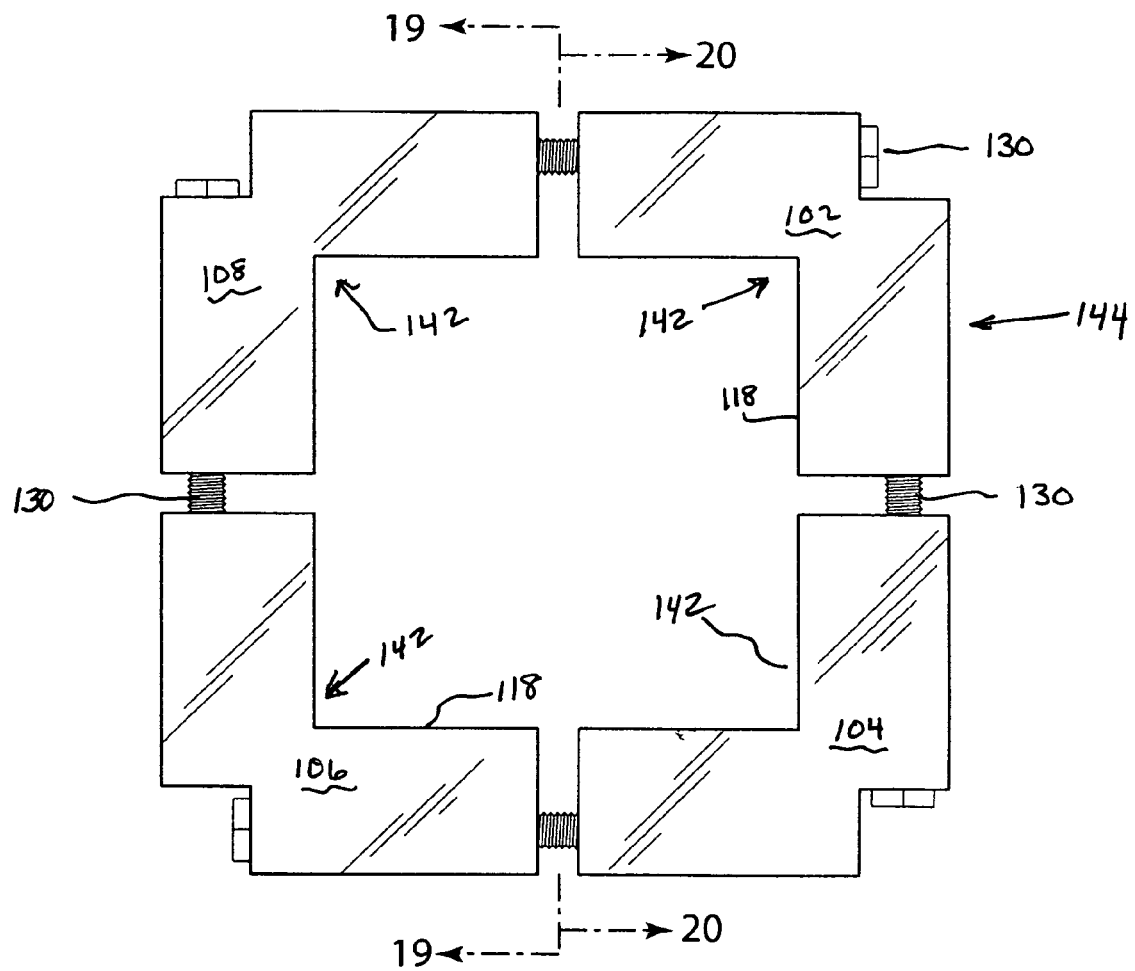
FIG. 18 is an alternative embodiment of four segmented adjustable clamp of FIG. 15 with a bearing and gripping surface coating.
Figures 19, 20:
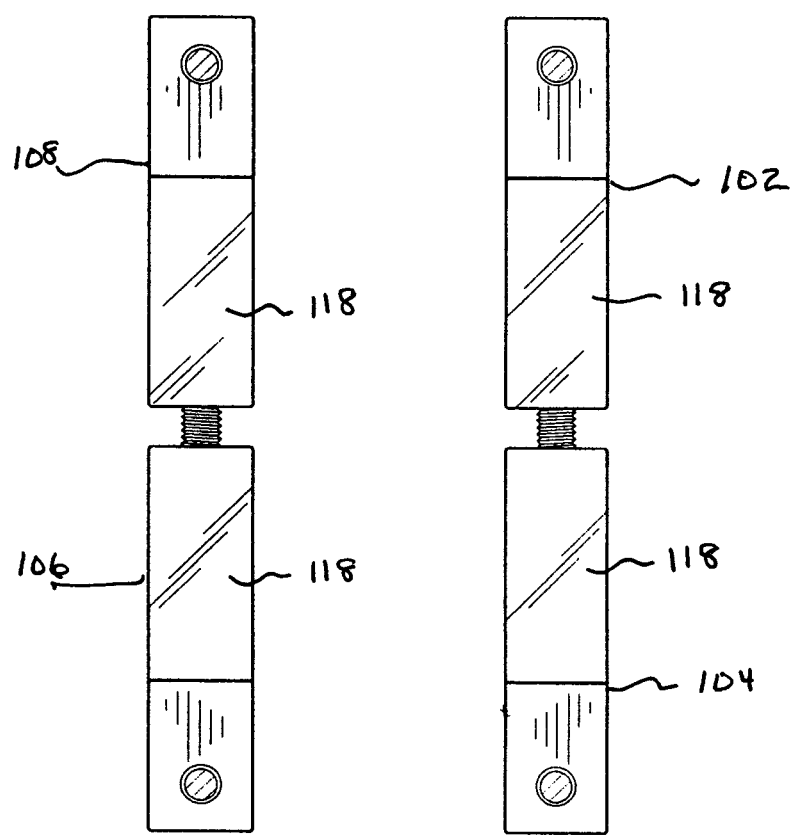
FIG. 19 is a view of the alternative embodiment of the adjustable four segmented clamp of FIG. 18 taken along the line 19-19.
FIG. 20 is a view of the alternative embodiment of the adjustable four segmented clamp of FIG. 18 taken along the line 20-20.
Figure 21:
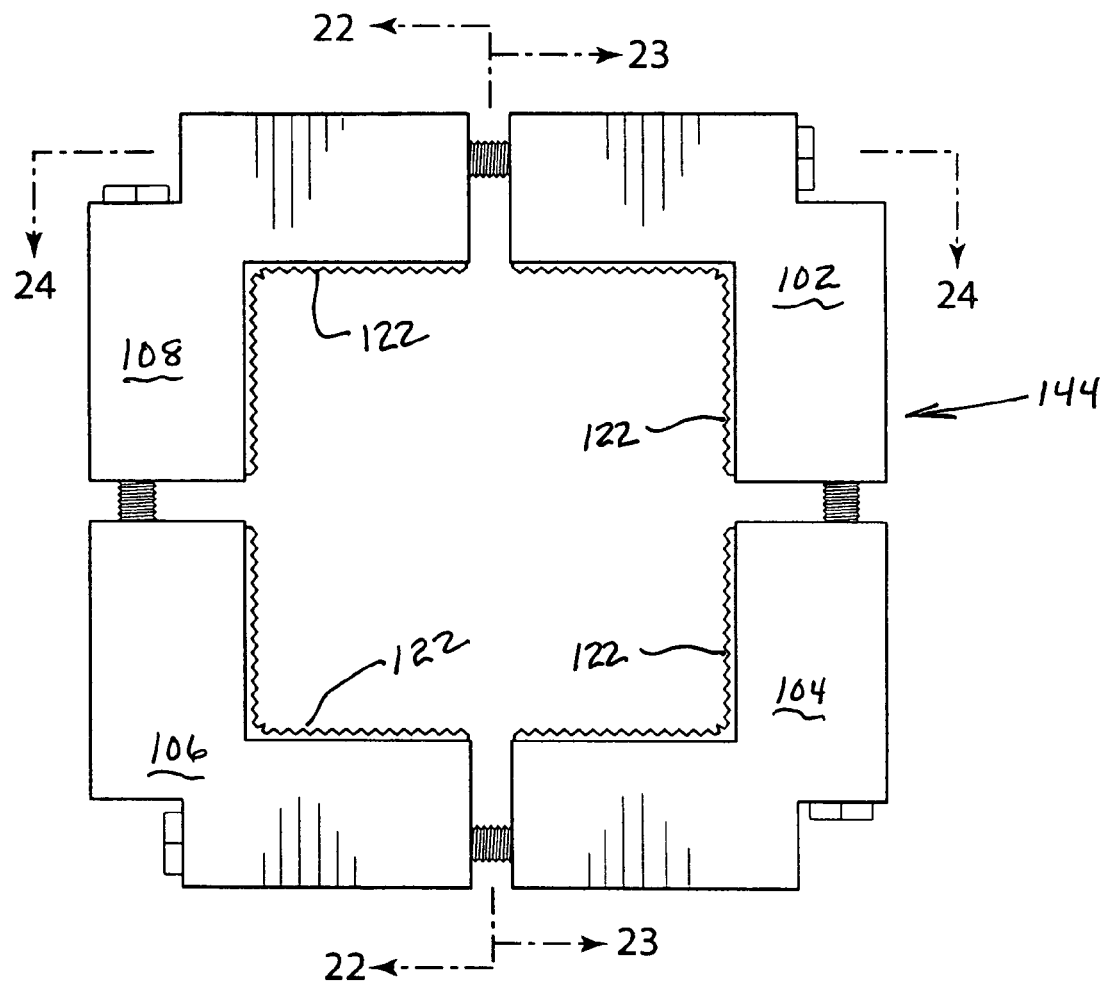
FIG. 21. is a further alternative embodiment of the adjustable four segmented clamp of FIG. 15 with a gripping clamping surface modification.
Figures 22, 23:
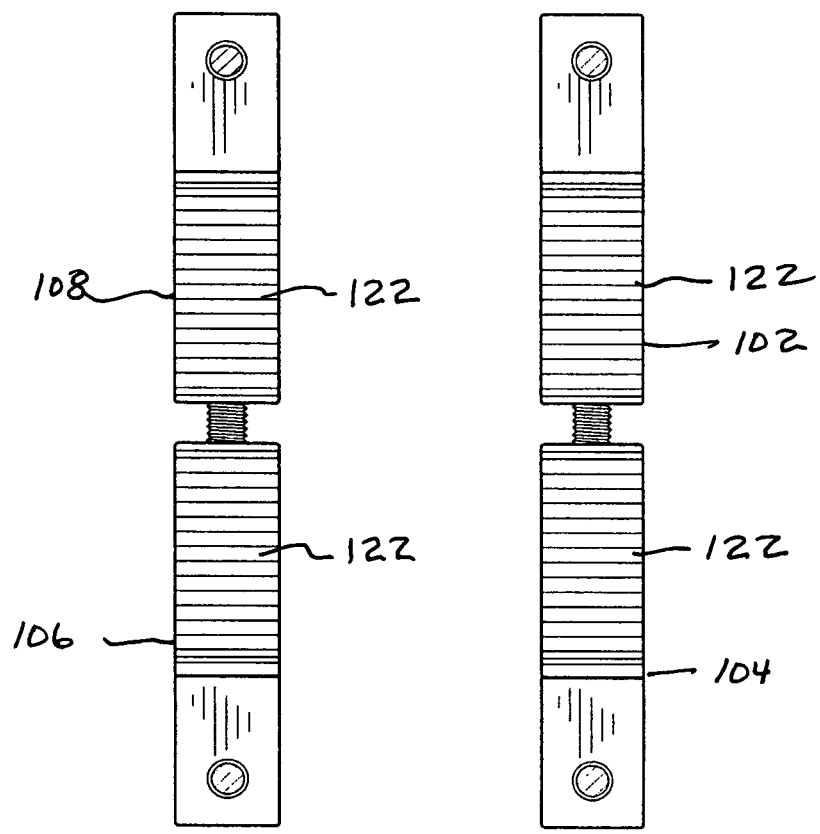
FIG. 22. is a view of the alternative embodiment of the adjustable four segmented clamp of FIG. 21 taken along the line 22-22.
FIG. 23 is a view of the alternative embodiment of the adjustable four segmented clamp of FIG. 21 taken along the line 23-23.

The rotatable adjustable segmented clamp 100 is not limited to circular pipes or shafts. Referring now to FIGS. 15-23 a change of the inside clamping surface 114 of each segment 102, 104, 106 and 108 to a rectangular gripping surface 142 allows the rotatable adjustable clamp 144 to accommodate rectangular pipes or shafts 146. As with clamp 100 clamp 144 can have a smooth gripping surface 148 (FIG. 32) a coated or treated surface which may be the same friction reducing treatment or coating on the rotatable bearing surface 110 (FIG. 18). Alternatively the clamping surface 114 may be a different surface or coating treatment which optionally include file like teeth or grooves 120 or teeth 122 (FIGS. 12 and 21).

Figure 30:
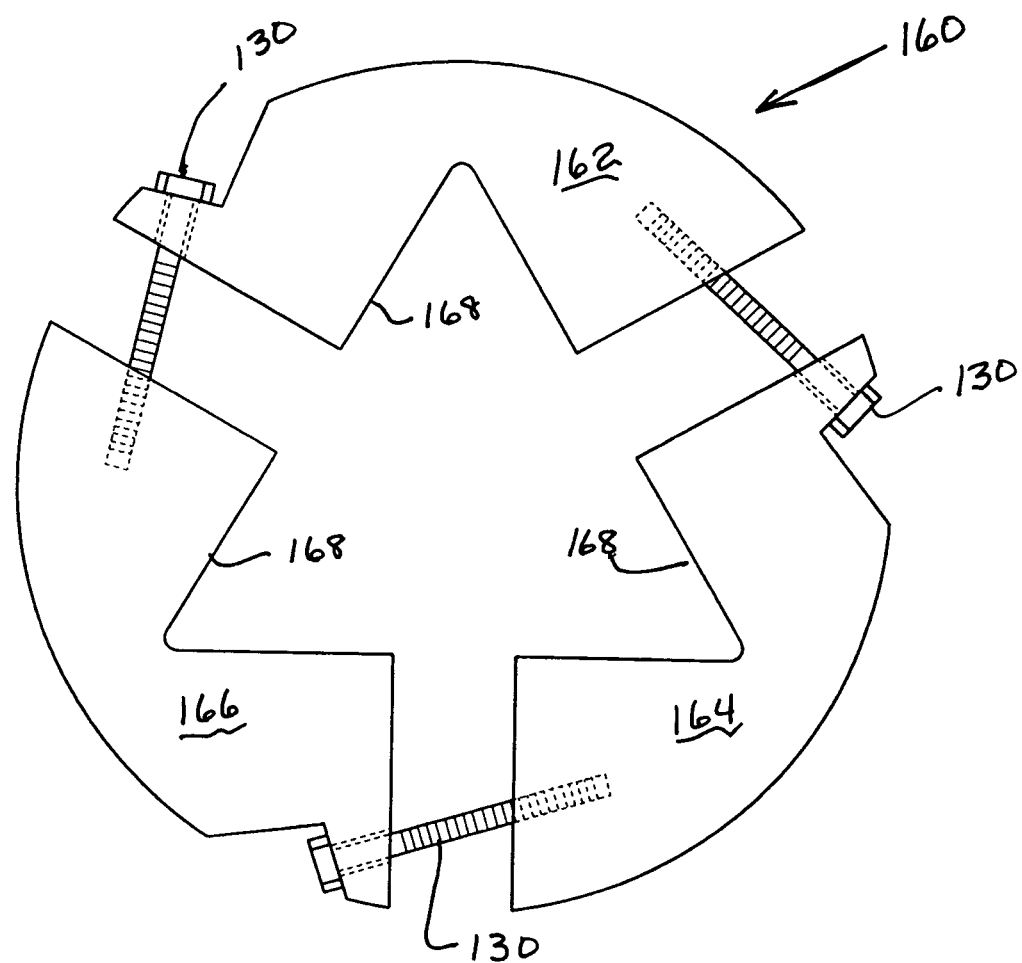
FIG. 30 is a top plan view of a further embodiment of the novel rotatable adjustable segmented clamp with three independently adjustable segments.

In a further preferred embodiment of the invention the number of segments in the rotatable adjustable clamp can be varied. Referring now to FIG. 30 a three segmented clamp 160 is illustrated. Each segment 162, 164 and 166 is connected by an adjustable fastener 130. The inner gripping surface 168 of each segment 162,164 and 166 is linear for accommodating a triangular pipe or shaft. The inner gripping surface 168 may be coated or treated as previously discussed with reference to clamps 100 and 144.

Figure 31:
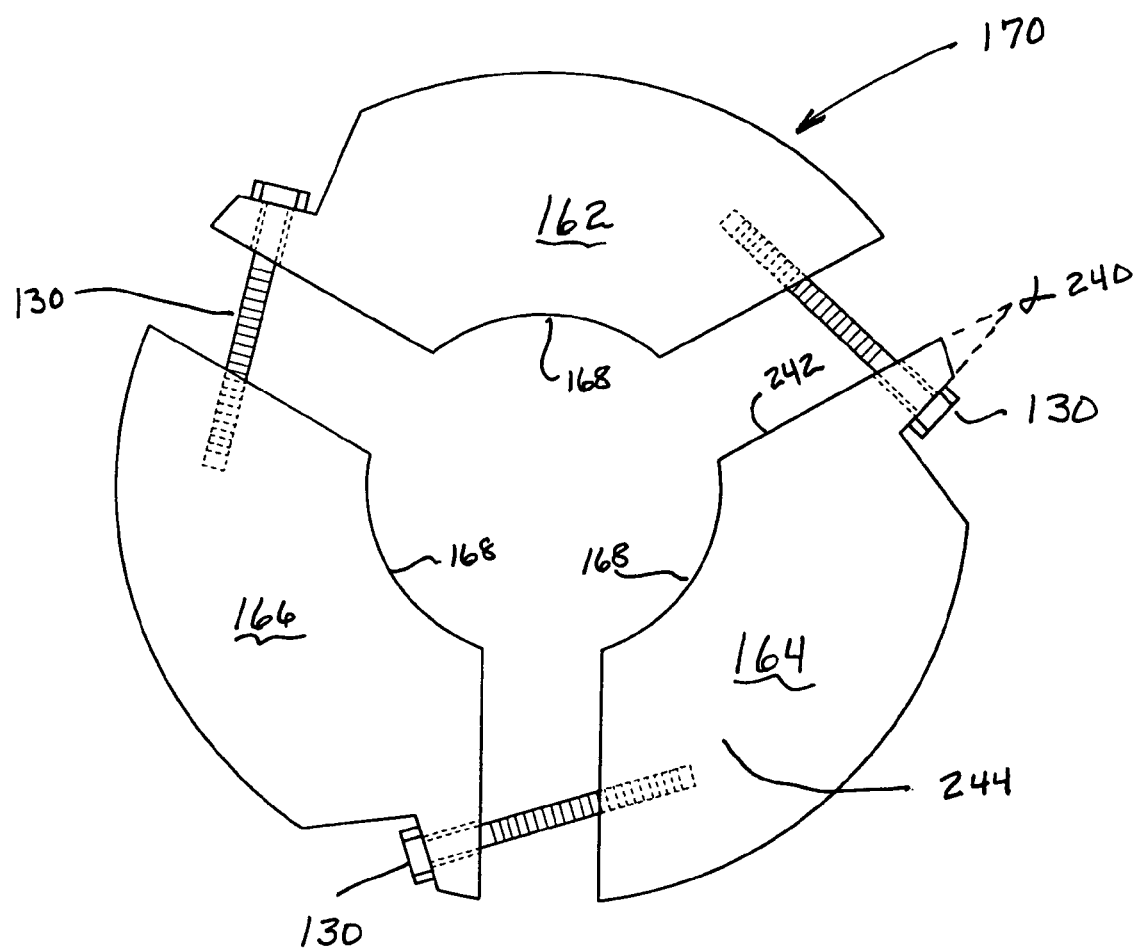
FIG. 31 is a top plan view of a further embodiment of the novel rotatable adjustable segmented clamp with three independently adjustable segments for a round pipe or shaft.

In a further embodiment of the invention as illustrated in FIG. 31 the inner gripping surface 168 can be modified to accommodate a circular pipe or shaft. Clamp 170 like clamp 160 has three identical segments 162, 164 and 166 except the inner gripping surface for engaging a circular pipe or shaft is substantially parallel to the outside perimeter of clamp 170. In all embodiments of the invention the adjustable fastener is disposed within the outer perimeter of the novel clamp. Clamp 170 like clamps 100 and 144 may have a treated or coated inner surface as well as a coated or treated bearing surface.

Referring now to FIG. 32 a six sided rotatable adjustable clamp 180 is illustrated having six identical segments 182, 184, 186, 188, 190 and 192. Each identical segment is connected to an adjacent segment by a hex bolt adjustable fastener 136. Each segment includes a rotatable bearing surface which may be coated or treated to reduce its coefficient of friction. Similarly the inside surface of each segment may be treated or coated as previously discussed with reference to clamps 100, 144, 160 and 170. Similar to all the other embodiments of the invention the hex adjustable fasteners 136 are disposed within the outer perimeter of the novel clamp to reduce the horizontal profile of the novel clamp.

Figure 33:
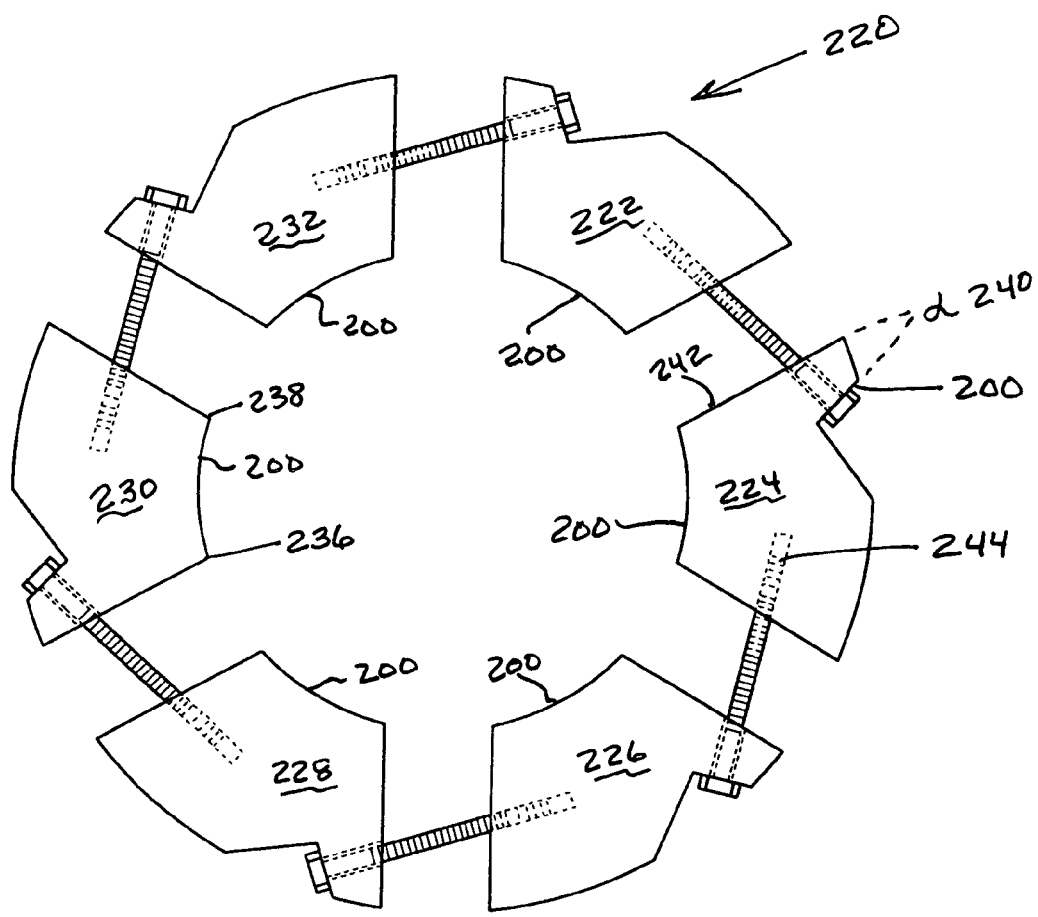
FIG. 33 is a top plan view of a further embodiment of the novel rotatable and adjustable segmented clamp with six independently adjustable segments.

Referring now to FIG. 33 a six sided adjustable clamp 220 can be constructed in accordance with the invention to increase the clamping power of the clamp by providing abutment angular segments 200 on each identical segment 222, 224, 226, 228, 230 and 232. The points 236 and 238 on each segment increases the biting ability of each segment to securely engage a pipe. This feature together with the abutment angular segment 200 allows each of the adjustable fasteners 222, 224, 226, 228, 230 and 232 to angle toward the circular pipe or shaft which by itself or together with surface coating treatment of the clamping surface increases the gripping power on the pipe or shaft.

The angle of the abutment 240 for the adjustable segments will vary according to the number of segments and the gripping power desired for the novel rotatable adjustable segmented clamp. A three segmented clamp as illustrated in FIG. 31 can have an abutment angular segment angle of about 30 degrees to reach the center of a segment 244 while a six segmented clamp as illustrated in FIG. 33 may have an angle of 20 degrees or less to reach the center of a segment 244. The angle of the abutment angular segment 200 along with the taper 242 face angle of each segment in FIG. 31 in comparison to FIG. 33 can be modified by those skilled in the art to suit particular applications and requirements.

As will be recognized by those skilled in the art the novel rotatable adjustable clamps of the invention are capable of wide applications and variability as to the configuration of the individual segments. The configuration of the inner clamp gripping surface of the novel segmented clamp is significant in providing adjustability in accommodating various shaft sizes and configurations. Where shaft or pipe sizes are circular the number of segments and the adjustability of the identical individual segments around the perimeter provide a great degree of choice in the plurality of segments employed. On the other hand where the shaft is triangular or square or some other geometric configuration the inside gripping surface will dictate the plurality of identical segments utilized in accordance with the preferred embodiment of the invention.

It will also be recognized the advantages of the invention can also be practical without having identical segments. However the identical segments provide the greatest economies in scale in practicing the invention and prevent having to maintain a large inventory of heterogeneous parts that can result in mistakes in the field in installation of the novel rotatable adjustable segmented clamp.

The embodiments and best mode of the invention have been illustrated and described and are not to be construed to limit the invention to the specific illustrations in the reference number list, drawings or embodiments described. It is to be understood that additional changes and modifications of the novel rotatable adjustable segmented clamps can be made in the configuration and appearance and equivalents that are within the true spirit and scope of the following claims.

As used herein and in the following claims, the words "comprising" or "comprises" is used in its technical sense to mean the enumerated elements included but do not exclude additional elements which may or may not be specifically included in the dependent claims. It will be understood such additions, whether or not included in the dependent claims, are modifications that both can be made within the scope of the invention. It will be appreciated by those skilled in the art that a wide range of changes and modification can be made to the invention without departing from the spirit and scope of the invention as defined in the following claims.

REFERENCE NUMBER LIST 42 water main valve
44 valve actuation shaft
46 arrow
48 valve
49 neck
50 adapter
52 spur gear assembly
54 bolts
58 stuffing box
60 bonnet bushing
62 valve bonnet
64 valve collar
66 valve housing
100 segmented rotatable adjustable clamp
102 segment
104 segment
106 segment
108 segment
110 rotatable bearing surface
112 coating
114 inside clamp surface
115 abrasive surface coating treatment
116 pipe or shaft
118 plastic or rubber
120 file like teeth or grooves
122 teeth
124 unthreaded aperture
126 boss
128 threaded aperture
130 adjustable fastener
131 space
132 machine bolt
134 carriage bolt
135 square opening
136 hex bolt
138 nut
140 Allen wrench
142 rectangular gripping surface
144 rotatable adjustable clamp
146 rectangular pipes or shaft
148 smooth gripping surface
160 3 segmented clamp
162 segment
164 segment
166 segment
168 inner gripping surface
169 3 segmented clamp circular shafts
170 rotatable adjustable clamp
180 six sided rotatable adjustable clamp
182 segment
184 segment
186 segment
188 segment
190 segment
192 segment
200 abutment angular segment
220 clamp
222 segment
224 segment
226 segment
228 segment
230 segment
232 segment
236 points
238 points
240 angle of abutment
242 taper
244 center of a segment

What is claimed is:

1. A rotatable adjustable segmented clamp device comprising:
    (a) a substantially flat rotatable bearing surface having an outer perimeter with an angular notch and opening in the angular notch to accommodate an adjustable fastener between the substantially flat rotatable bearing surface and a top surface;
    (b) an adjustable non rotatable clamping surface disposed substantially perpendicular to the substantially flat rotatable bearing surface and terminating in the top surface;
    (c) a plurality of individual segments each forming a part of the top surface, the rotatable bearing surface and the clamping surface with each segment having an opening to adjustably and fixedly engage the adjustable fastener; and
    (d) a plurality of separate adjustable fasteners to sequentially connect each of the plurality of individual segments to form said outer perimeter with an adjustable space between each of the plurality of individual segments and a single adjustment area within the outer perimeter on each segment to adjust the adjustable space.

2. The clamp device of claim 1 further comprising a friction reduction coating or treatment on the substantially flat rotatable bearing surface.

3. The clamp device of claim 2 wherein said friction reduction coating is plastic.

4. The clamp device of claim 1 further comprising a surface treatment or coating on the clamping surface.

5. The clamp device of claim 4 wherein the clamping surface treatment or coating forms an abrasive surface.

6. The clamp device of claim 5 wherein the clamping surface treatment forms a plurality of grooves.

7. The clamp device of claim 5 wherein the clamping surface treatment forms a plurality of teeth.

8. The clamp device of claim 4 wherein the clamping surface treatment forms an electrical insulation.

9. The clamp device of claim 1 wherein said plurality of individual segments are four segments and said plurality of separate adjustable fasteners are four threaded bolts.

10. The clamp device of claim 9 wherein the opening in the angular notch is an unthreaded opening and the opening to adjustably and fixedly engage the adjustable fastener is a threaded opening in each of said four segments in tangential alignment with the outer perimeter.

11. A rotatable clamp mechanism comprising:
 (a) a plurality of segments with each segment having an outer perimeter, a top surface connecting at one side the top surface and the substantially flat rotatable bottom surface to the outer perimeter and at the other side connecting a substantially flat rotatable bottom surface and a clamp gripping surface coincident with said top surface and said substantially flat rotatable bottom surface;
 (b) a plurality of adjustable fasteners disposed in an opening on the outer perimeter disposed in substantial parallel or tangential alignment with the outer perimeter; and
 (c) a single adjustable locking opening in the outer perimeter to lock each of the plurality of adjustable fasteners on the plurality of segments in sequential alignment.

12. The rotatable clamp mechanism of claim 11 wherein each of the plurality of segments are identical in configuration.

13. The rotatable clamp mechanism of claim 12 wherein the clamp gripping surface is of a cylindrical, rectangular or triangular configuration.

14. The rotatable clamp mechanism of claim 12 wherein said plurality of segments are four segments and the plurality of adjustable fasteners are bolts.

15. The rotatable clamp mechanism of claim 14 wherein said adjustable locking opening in the notched outer perimeter are threads disposed in one end of the plurality of segments or a plurality of nuts.

16. The rotatable clamp mechanism of claim 11 further comprising a friction reducing treatment on the substantially flat rotatable bottom surface of each of said plurality of segments.

17. The rotatable clamp mechanism of claim 11 wherein the clamp surface and the substantially flat rotatable bottom surface are coated with the same or a different coating material.

18. A clamp apparatus to prevent failure of a bonnet bushing in a water main valve comprising:
 (a) a low profile rotatable adjustable segmented clamp;
 (b) having a plurality of segments each segment having a notched outer perimeter, a top surface, a substantially flat rotatable bottom surface and a clamp surface coincident with said top surface and said substantially flat rotatable bottom surface;
 (c) an unthreaded opening in one end of the notched outer perimeter of each segment and a threaded opening in the other end in the notched outer perimeter in substantial parallel alignment with the outer perimeter; and
 (d) a plurality of bolts disposed within the outer perimeter of the plurality of segments and between the unthreaded opening in one segment and the threaded opening of an adjacent segment.

19. The low profile rotatable adjustable segmented clamp of claim 18 further comprising a surface treatment on the clamp surface of each segment.

20. The low profile rotatable adjustable clamp of claim 19 wherein the clamp surface treatment provides file like teeth or grooves.

* * * * *